United States Patent [19]
Grant et al.

[11] 4,381,206
[45] Apr. 26, 1983

[54] ADVANCED SOLID REACTANTS FOR $H_2/D_2$ GENERATION

[75] Inventors: Louis R. Grant, Los Angeles; Joseph E. Flanagan, Woodland Hills, both of Calif.

[73] Assignee: The United States of America as represented by the Secretary of the Army, Washington, D.C.

[21] Appl. No.: 285,163

[22] Filed: Jul. 20, 1981

[51] Int. Cl.$^3$ ............................................. C06B 43/00
[52] U.S. Cl. .................. 149/22; 423/648 R; 423/648 A
[58] Field of Search ............ 149/22; 60/218, 219; 372/53; 423/648 R, 648 A

[56] References Cited

U.S. PATENT DOCUMENTS

| | | | |
|---|---|---|---|
| 3,170,283 | 2/1965 | Sayles | 149/22 X |
| 3,382,050 | 5/1968 | Coleman | 149/22 X |
| 3,666,672 | 5/1972 | Hiltz | 252/188 |
| 3,948,699 | 4/1976 | Ayers et al. | 149/22 |
| 4,157,927 | 6/1979 | Chew et al. | 149/22 |
| 4,166,843 | 9/1979 | Flanagan | 149/22 |

*Primary Examiner*—Leland A. Sebastian
*Attorney, Agent, or Firm*—Nathan Edelberg; Robert P. Gibson; Jack W. Voigt

[57] ABSTRACT

Disclosed is an all amine borane gas generating system which consists of hydrazine bis-borane or its deuterated derivative in the form of a compacted solid propellant pellet which serves as the thermal stimulus for the decomposition of itself. An all amine borane gas generating system which additionally consists of diborane diammoniate or its deuterated derivative provides a higher yield of hydrogen or deuterium with a higher purity from a self-sustaining reaction after the self-sustaining reaction is initiated by a heat source (e.g., an electrically heated nichrome wire) sufficient to initiate the reaction. This all amine borane gas generating system which consists of $N_2H_4.2BH_3$ and $H_2B(NH_3)_2BH_4$ is in the form of a compacted solid propellant pellet. The pellets are formed to the desired configuration employing pressures from about 500 to about 10,000 pounds total load. The solid propellant pellets are useful as a $H_2$ or $D_2$ generation sources for fuels for lasers.

1 Claim, No Drawings

ADVANCED SOLID REACTANTS FOR $H_2/D_2$ GENERATION

DEDICATORY CLAUSE

The invention described herein was made in the course of or under a contract or subcontract thereunder with the Government; therefore, the invention described herein may be manufactured, used, and licensed by or for the Government for governmental purposes without the payment to us of any royalties thereon.

BACKGROUND OF THE INVENTION

The development of hydrogen and/or deuterium generation sources for fuels for lasers has obviated the need for high pressure storage facilities under cryogenic conditions.

After the development of hydrogen and/or deuterium generation sources for high purity laser fuels the needs were recognized for additional improvements such as chemical reactants capable of generating hydrogen or deuterium in higher yield and with higher purity as evidenced by the evolution of the art described below.

Compositions which generate hydrogen as disclosed in U.S. Pat. No. 3,666,672, "Hydrogen Generating Compositions", by Ralph H. Hiltz. Disclosed is an autogeneously combustible composition that liberates hydrogen on burning. The composition contains an alkali metal borohydride and a hydrazine sulfate in proportions such that there are between about 0.5 to 2 boron atoms for each nitrogen atom.

Another example of a prior art source for hydrogen generation is disclosed by Huskins et al in U.S. Pat. No. 3,940,474 wherein unsolvated aluminum hydride is decomposed by a heat source (e.g., a wire of about 80% nickel and 20% chromium with a predetermined diameter which is positioned in contact with the unsolvated aluminum hydride, and provided with a means for electrically heating the hydride to a decomposition temperature range from about 180° C. to about 185° C.) to provide hydrogen gas at a lower temperature.

Examples of prior art compositions for producing hydrogen or deuterium at about 600° C.–700° C. are disclosed by Ayers et al in U.S. Pat. No. 3,948,699. These compositions are based on complex metal boron compounds of the general formula $M(BH_4)_x$ or $M(BD_4)_x$, (wherein M equals a metal and x equals the valence of the metal M; M is an alkali metal or an alkali earth metal; H is hydrogen, and D is deuterium) and metal oxides of the general formula $Q_2O_3$ (wherein Q is a trivalent metal selected from iron, aluminum, gallium, cobalt, and indium) combined stoichiometrically.

Higher temperature hydrogen or deuterium (e.g., about 3000° C.) production is disclosed by Ayers et al in U.S. Pat. No. 3,948,700. This patent discloses a storable solid propellant composition based on unsolvated aluminum deuteride or unsolvated aluminum hydride and ferric oxide which produces high temperature gases from a self-sustaining reaction, once started, by a heat source such as an electrically heated nickel-chromium ignition wire. The hydrogen or deuterium produced is acceptable for use in HF/DF and HCl chemical lasers, the gas dynamic laser (GDL), or a source of hot gases for reducing fuel.

Additional prior art is disclosed by Chew et al in U.S. Pat. No. 4,061,512 which relates to storable solid propellant compositions based on complex metal boron compounds of the general formula $M(BH_4)_x$ or $M(BD_4)_x$ (wherein M equals a metal and x equals the valence of the metal M; M is an alkali metal or an alkaline earth metal; H is hydrogen, and D is deuterium) and ammonium salts of the general formula $(NH_4)_nY$ or deuteroammonium salts of the general formula $(ND_4)_nY$ (wherein Y represents an anion with a total charge of n; N is nitrogen, H is hydrogen, and D is deuterium. The specified compounds combined stoichiometrically or in varying molar ratios produce hydrogen or deuterium that contains nitrogen as an inert diluent which is acceptable for use in HF/DF chemical lasers, the gas dynamic laser GDL, or as a source of hydrogen containing an inert diluent.

In recent disclosures by Chew et al in U.S. Pat. No. 4,157,927, a class of compounds known as amineboranes and their derivatives are mixed with heat producing compounds such as lithium aluminum hydride or a mixture, such as $NaBH_4/Fe_2O_3$ mixtures combined in definite proportions in a mixer or ball mill to produce a uniformly mixed powder. The mixed powder is then pressed into pellets and ignited to produce the hydrogen or deuterium as well as byproducts that are non-deactivating diluents. The oxide/borohydride or oxide/aluminohydride combination provides the thermal energy for decomposition of the amine borane.

Advantageous would be an all amine borane system for producing hydrogen in high yield. This would obviate the requirement of the oxide/borohydride or oxide/aluminohydride compound which provides the thermal energy for decomposition. Thus, on a weight percentage basis an all amine borane system would provide a higher hydrogen yield than the mixed system of the prior art.

An object of this invention is to provide an all amine borane source for high purity hydrogen or deuterium generation.

Another object of this invention is to provide an all amine borane system which serves as the thermal stimulus for decomposition of itself to yield high purity hydrogen or deuterium.

Still a further object of this invention is to provide a source for high purity hydrogen or deuterium generation in the form of a solid propellant composition that is an all amine borane system comprised of one amine borane compound which serves as the ignition source for itself as well as the ignition source for another high yielding hydrogen or deuterium amine borane compound with which the ignition source compound is combined.

SUMMARY OF THE INVENTION

The all amine borane gas generating system of this invention is in the form of a compacted solid propellant pellet which liberates a high purity hydrogen or deuterium when decomposed. The basic solid propellant pellet consists of hydrazine bis-borane which serves as the thermal stimulus for the decomposition of itself. Hydrazine bis-borane also serves as the thermal stimulus for the decomposition of diborane diammoniate with which it is combined to produce higher yields of hydrogen with higher purity. Deuterated analogs of the specified compounds serve as the reactant compounds for deuterium generation. The hydrazine bis-borane produces sufficient heat to decompose itself as well as the diborane diammoniate after decomposition is initiated by a heat source such as an electrically heated nichrome wire (80% Ni and 20% Cr) placed in contact with the composition.

DESCRIPTION OF THE PREFERRED EMBODIMENT

The advanced $H_2/D_2$ generator composition in the form of an all amine borane solid propellant composition consists of hydrazine bis-borane ($N_2H_4.2BH_3$), which serves as the ignition source after decomposition temperature is initiated by an electrically heated nichrome wire (80% Ni and 20% Cr), and diborane diammoniate ($H_2B(NH_3)_2BH_4$).

The following results are typical of the results obtained from decomposition testing of the reactant materials of the all amine borane solid propellant composition of this invention.

| DECOMPOSITION TESTING | | | | |
|---|---|---|---|---|
| | TEST NUMBER | | | |
| COMPONENT | 1 | 2 | 3 | 4 |
| $N_2H_4.2BH_3$, Weight percent | 40 | 50 | 60 | 100 |
| $H_2B(NH_3)_2BH_4$, Weight percent | 60 | 50 | 40 | — |
| $H_2$ yield, Weight percent | 16.7 | 16.5 | 15.3 | 13.4 |
| $H_2$ purity | 99.4 | 99.6 | 99.6 | 99.0 |

As noted from the decomposition testing, hydrazine bis-borane in pure states yielded 13.4 weight percent $H_2$ of 99.0% purity. When the ratios of the igniter (hydrazine bis-borane) varied from 60–40 weight percent and the diborane diammoniate varied from 40–60 the $H_2$ yield varied from 15.3 weight percent to 16.7 weight percent with an hydrogen purity from 99.4% to 99.6%.

The basic all amine borane system of this invention consists of hydrazine bis-borane or its deuterated derivative in the form of a compacted solid propellant pellet which produces hydrogen or deuterium from a self-sustaining reaction after said reactions is initiated by a heat source sufficient to initiate said reaction. In other words, hydrazine bis-borane or its deuterated derivative provides the thermal stimulus for decomposition of itself; that is, it is the ignition source for an all amine borane system.

For a system which produces a higher yield of hydrogen or deuterium, the system additionally consists of diborane diammoniate or its deuterated derivative which is intimately mixed and compacted into a solid propellant pellet in a predetermined weight percent ratio with the ignition source for an all amine borane system. The ignition source varies from about 60 to about 40 weight percent while the diborane diammoniate varies from about 40 to 60 weight percent to provide the maximum yield of hydrogen or deuterium of high purity.

The hydrogen or deuterium generated from the all amine borane system of this invention meets the purity requirements for laser or other uses where high purity is required. The total gas flow rate from the pellet which is compacted using pressures from about 500 to about 10,000 pounds total load can be adjusted to the desired value by controlling the pellet configuration and the formulation of the pellet.

The initiation of the self sustaining reaction for the ignition source of the all amine borane system is accomplished by a single heated nichrome wire for a smaller system or by the combination of a heated nichrome wire and an igniter sheet material for ignition of a larger surface area. The igniter sheet material is available in wet form which facilitates the cutting into the proper shape to match the pellet surface. The sheet igniter material should be dried prior to use and should produce no gaseous combustion products to contaminate the hydrogen or deuterium generated.

We claim:

1. An all amine borane gas generating system consisting of hydrazine bis-borane or its deuterated derivative and diborane diammoniate or its deuterated derivative in the form of a compacted solid propellant pellet for producing high purity hydrogen or deuterium in high yield from a self-sustaining reaction after said reaction is initiated by a heat source sufficient to initiate said reaction, said hydrazine bis-borane being an ignition source for said all amine borane gas generating system by serving as a thermal stimulus for decomposition of itself and additionally as a thermal stimulus for decomposition of said diborane diammoniate or its deuterated derivative, said ignition source being present in said compacted solid propellant pellet in an amount from about 60 to about 40 weight percent while said diborane diammoniate is present in an amount from about 40 to about 60 weight percent in said compacted solid propellant pellet for producing a high yield of hydrogen or deuterium in the range from about 15 weight percent to about 17 weight percent and of a purity in the range of about 99 percent or greater.

* * * * *